United States Patent Office 3,761,287
Patented Sept. 25, 1973

3,761,287
PROCESS FOR THE MANUFACTURE OF MEAT FLAVORS
Kurt Jaeggi, Dubendorf, Switzerland, assignor to Givaudan Corporation, Clifton, N.J.
No Drawing. Filed Nov. 24, 1971, Ser. No. 202,007
Claims priority, application Switzerland, Dec. 23, 1970, 19,071/70
Int. Cl. A23l 1/26
U.S. Cl. 99—140 R     16 Claims

ABSTRACT OF THE DISCLOSURE

A process for the manufacture of flavors and aromas for food by heating a mixture containing a pentose, a polyalcohol, proline, methionine, cysteine and possibly other amino acids.

RELATED APPLICATION

This application claims priority from applicant's copending Swiss application S.N. 19,071/70, filed Dec. 23, 1970.

FIELD OF THE INVENTION

Synthetic meat aromas.

SUMMARY OF THE INVENTION

The present invention relates to synthetic meat aromas. More particularly, the invention is concerned with a process for the manufacture of synthetic meat aromas, with foodstuffs, delicacies and feedstuffs containing said aromas and with a method for the aromatization of foodstuffs, delicacies and feedstuffs by means of said aromas.

According to the process provided by the present invention, synthetic meat aromas are manufactured by heating a charge comprising a pentose, a polyalcohol, and a mixture of amino acids, said mixture containing at least some proline, cysteine, and methionine.

The amino-acids aforesaid can be employed as such or in the form of derivatives or salts thereof which form the free amino-acids under the conditions of the process.

DESCRIPTION OF THE PREFERRED EMBODIMENTS

The amino acids charged may comprise not only proline, cysteine and methionine, but may also comprise other amino acids; for example, smaller amounts of the amino acids known to occur in meat, such as, for example, alanine, arginine, cysteine, glycine, histidine, isoleucine, leucine, lysine, serine, threonine, valine, anserine, carnesine or taurine. There may also be utilized the acid salts of these amino acids. Any physiologically acceptable amino acid salts may be utilized, however, the hydrochlorides we deemed especially suitable.

The amount of amino acids present in the mixture expediently amounts to 2 to 40%, preferably 5 to 30 wt. percent. If less than 2 wt. percent of amino acids are present, no powerful aroma is obtained and, indeed, it can even be markedly weak.

If more than 40 wt. percent are present, undesired side-reactions can occur.

According to a preferred embodiment of the present process, proline is employed as the main component of the three amino acids aforesaid. The use of a mixture in which over 50 wt. percent of the amino acid ingredients consists of proline is preferred. On the other hand, however, this amount should not exceed 85 to 90%, since otherwise the aroma which is obtained is reminiscent of bread.

Ribose is preferably employed as the pentose, although other pentoses such as, for example, arabinose or xylose can also be employed. Mixtures of such pentoses can also be employed. The amount of pentose present expediently amounts to 0.4 to 18 wt. percent and preferably 1 to 10 wt. percent.

As polyalcohols there can be employed, for example, trihydric alcohols such as glycerine, or glycols such as, for example, propylene glycol. The polyalcohol can be present in the mixture in an amount of 9 to 90 wt. percent, preferably 40 to 90 wt. percent.

Suitable proportions of the main components of the mixture used in accordance with the present invention are given in the following Table I:

TABLE I

| | Percent by weight |
|---|---|
| Proline | 1.0–40 |
| Cysteine | 0.1–30 |
| Methionine | 0.1–16 |
| Pentose | 0.4–18 |
| Polyalcohol | 9.0–90 |

As a rule, the desired meat aroma is formed when the mixture used as the starting material is heated to temperatures og 90°–170° C., in particular to about 110°–130° C. The heating time is normally inversely proportional to the heating temperature; it expediently amounts to about 15 minutes to 2 hours.

Besides the aforementioned main components, there can also be present in the mixture other ingredients such as aroma enhancers [e.g. 0.1–200% monosodium glutamate, 0.1–100% disodium inosine-5'-monophosphate (IMP) and disodium guanosine-5-phosphate (GMP)], fats (e.g. groundnut oil) or special aroma substances (e.g. butter or synthetic butter composition).

The products obtained after the heating are highly concentrated synthetic meat aromas which may be diluted or distributed in edible materials in a manner known per se. They can be converted according to methods which are known per se into the usual forms of presentation such as solutions, pastes or powders. The product can be spray-dried, vacuum-dried or lyophilised. As carrier materials there can be used, for example, gum arabic, salts or brewers yeast or similar adsorbancies. Indoles, maltol, dienals, spice oleoresins or smoke aromas can also be added as flavour-improvers.

The thus formulated products can serve for the aromatization of many kinds of foodstuffs, delicacies and feedstuffs; for example, meat-like products manufactured from natural or synthetic proteins as well as chips etc.

The following Table II gives a basis for suitable concentrations of the synthetic meat aromas in various forms of presentation.

TABLE II

| Form of presentation | General, percent | Preferred, percent |
|---|---|---|
| Solutions | 1–100 | 10–60 |
| Pastes | 1–100 | 10–90 |
| Spray-dried powder | 3–60 | 15–35 |
| Lyophilised vacuum-dried powder | 2–30 | 8–18 |

The following examples illustrate the present invention:

Example 1

An intimate mixture containing:

| | | |
|---|---|---|
| Proline | g | 1.5 |
| Cysteine | g | 1.25 |
| Methionine | g | 0.3 |
| Ribose | g | 0.8 |
| Butter aroma | g | 0.2 |
| Glycerine | ml | 20 | is heated with constant stirring to 120° C. held at this temperature for 1 hour. The resulting product has a powerful meat aroma. By dilution with hot water (2 g. to 1 litre), there is obtained a clear broth with a marked meat aroma.

Example 2

An intimate mixture containing:

| | | |
|---|---|---|
| Proline | g | 16 |
| Cysteine | g | 2.5 |
| Methionine | g | 0.6 |
| Ribose | g | 2.5 |
| Glycerine | ml | 40 |
| Butter | g | 0.2 |
| Groundnut oil | ml | 20 |
| IMP | g | 20 | is cautiously heated with stirring to 120° C. and with constant further stirring held at this temperature for 1 hour. Addition of 0.2% of this product to a sauce imparts to the latter a marked aroma of boiled meat.

Example 3

An intimate mixture containing:

| | | |
|---|---|---|
| Proline | g | 6.0 |
| Cysteine | g | 5.0 |
| Methionine | g | 1.2 |
| Ribose | g | 3.2 |
| Glycerine | ml | 5 |
| Butter | g | 0.6 |
| Guanylic acid | g | 20 |
| GMP | ml | 15 | is cautiously heated with stirring to 120° C. and then held at this temperature for 1 hour. The product has a flavour of boiled meat with a fatty note. By mixing this product with 0.1–5%, preferably 6%, of an artificial smoke aroma, there results a product with marked ham note which can be used for aromatizing broths, meat substitutes from protein-containing materials, crackers or potato crisps.

Example 4

An intimate mixture of:

| | | |
|---|---|---|
| Proline | g | 30 |
| Cysteine | g | 7 |
| Methionine | g | 2 |
| Ribose | g | 7 |
| Glycerine | g | 100 |
| Water | ml | 50 | is cautiously heated with stirring to 120° C. and held at this temperature for 1 hour. The product has marked roast beef flavour. It can, for example, be used in amounts of 0.2–4% for imparting the typical roast beef flavour to purely synthetic fibrous meat substitute.

Example 5

An intimate mixture of:

| | | |
|---|---|---|
| Proline | g | 7 |
| Cysteine | g | 4.0 |
| Methionine | g | 0.4 |
| Xylose | g | 3.5 |
| Glycerine | ml | 50 |
| Butter aroma | g | 0.25 |
| GMP | g | 10 |
| Groundnut oil | ml | 50 |
| Water | ml | 15 | is cautiously heated with stirring to 120° C. and held at this temperature for 1 hour. The product can be added to a waffle filling to which it imparts a delicious flavour of roast liver in amounts of about 1.5%.

Example 6

An intimate mixture of:

| | | |
|---|---|---|
| Proline | g | 28.0 |
| Cysteine | g | 6.6 |
| Methionine | g | 1.6 |
| Ribose | g | 6.8 |
| Glycerine | ml | 57.0 |
| Water | ml | 50.0 | is cautiously heated with stirring to 120° C. and held at this temperature for 1 hour. The product has a marked roast beef flavour and can be used for the manufacture of a "dip" for potato crisps.

Example 7

A potato crisp dip is manufactured according to the following process:

| | G. |
|---|---|
| Product of Example 6 | 5.8 |
| Edible curd | 200 |
| Whipped cream | 100 |
| Salt | 2 |
| Paprika | 0.1 |
| Pepper | 0.1 |
| Chives (fresh) | 1.5 |

The edible curd is firstly stirred to a fine mass and the whipped cream is cautiously admixed therewith. The spices are added to the resulting homogeneous mass.

I claim:

1. A process for the manufacture of synthetic meat tures within the range 90–170° C. for about 15 minutes to 2 hours, a mixture comprising a pentose, a polyalcohol and a mixture of amino acids or the physiologically acceptable salts thereof, said mixture of amino acids comprising at least proline, methionine and cysteine, said mixture of amino acids comprising between 2 and 40 wt. percent of the total weight of the reactants.

2. A process according to claim 1, wherein the said amino acids comprise 5 to 30 wt. percent of the reactants.

3. A process according to claim 1, wherein proline, cysteine and methionine are the only amino acids charged.

4. A process according to claim 1, wherein 50 to 90 wt. percent of the amino acid mixture consists of proline.

5. A process according to claim 1, wherein the reactants comprise 1 to 40% proline, 0.1 to 30% cysteine, 0.1 to 16% methionine, 0.4 to 18% of a pentose and 9 to 90% of a polyalcohol.

6. A process according to claim 1, wherein the reactants also comprise water.

7. A process according to claim 1, wherein the reactants are heated to a temperature of between 110° C. and 130° C.

8. A process according to claim 1, wherein said pentose comprises 0.4 to 18 wt. percent of the reactants.

9. A process according to claim 8, wherein said pentose comprises 1 to 10 wt. percent of the reactants.

10. A process according to claim 9, wherein the pentose is ribose.

11. A process according to claim 1, wherein 9 to 90 wt. percent of the reactants comprise a polyalcohol.

12. A process according to claim 11, wherein 40 to 90 wt. percent of the reactants comprise a polyalcohol.

13. A process according to claim 12, wherein the polyalcohol is glycerine.

14. A synthetic meat flavour composition, manufactured according to the process of claim 1.

15. A foodstuff which comprises an olfactible amount of a synthetic meat flavour composition of claim 14.

16. A method for the aromatization of foodstuffs which comprises adding an olfactible amount of a synthetic meat flavour composition of claim 14 to foodstuffs.

References Cited

UNITED STATES PATENTS

| | | | |
|---|---|---|---|
| 3,478,015 | 11/1969 | Onishi et al. | 99—140 R |
| 3,394,015 | 7/1968 | Giacino | 99—140 R |
| 3,365,306 | 1/1968 | Perret | 99—140 N |
| 3,493,395 | 2/1970 | Soeters | 99—140 R |
| 3,519,437 | 7/1970 | Giacino | 99—140 R |
| 3,547,659 | 12/1970 | Cort | 99—140 R |

OTHER REFERENCES

Macy et al.: "Water Soluble Flavor & Odor Precursors of Meat," J. Food Sci., vol. 29 (1964), pp. 136–141.

MORRIS O. WOLK, Primary Examiner

S. MARANTZ, Assistant Examiner

U.S. Cl. X.R.

99—144